(12) United States Patent
Zhao

(10) Patent No.: US 10,951,754 B2
(45) Date of Patent: Mar. 16, 2021

(54) METHOD FOR RESPONDING TO INCOMING CALL BY MEANS OF FINGERPRINT RECOGNITION, STORAGE MEDIUM, AND MOBILE TERMINAL

(71) Applicant: JRD Communication (Shenzhen) LTD., Shenzhen (CN)

(72) Inventor: Hengchang Zhao, Shenzhen (CN)

(73) Assignee: JRD Communication (Shenzhen) LTD., Shenzhen (CN)

(*) Notice: Subject to any disclaimer, the term of this patent is extended or adjusted under 35 U.S.C. 154(b) by 0 days.

(21) Appl. No.: 16/642,038

(22) PCT Filed: Aug. 28, 2018

(86) PCT No.: PCT/CN2018/102796
§ 371 (c)(1),
(2) Date: Feb. 26, 2020

(87) PCT Pub. No.: WO2019/042292
PCT Pub. Date: Mar. 7, 2019

(65) Prior Publication Data
US 2020/0252502 A1    Aug. 6, 2020

(30) Foreign Application Priority Data
Aug. 28, 2017    (CN) .......................... 201710749759.3

(51) Int. Cl.
*H04M 1/725*    (2021.01)
*H04M 19/04*    (2006.01)
(Continued)

(52) U.S. Cl.
CPC .... *H04M 1/72597* (2013.01); *G06F 3/04883* (2013.01); *G06F 21/32* (2013.01); *G06K 9/00067* (2013.01); *H04M 1/72522* (2013.01)

(58) Field of Classification Search
CPC ......... H04M 1/72597; H04M 1/72522; H04M 1/72563; H04M 19/04; G06F 3/04883;
(Continued)

(56) References Cited

U.S. PATENT DOCUMENTS 6,954,553 B2    10/2005    Ikegami
10,116,787 B2   10/2018    Tanabe et al.
(Continued)

FOREIGN PATENT DOCUMENTS

CN    106599665    4/2017
CN    106850988    6/2017
(Continued)

OTHER PUBLICATIONS

International Search Report and the Written Opinion dated Nov. 19, 2018 From the International Searching Authority Re. Application No. PCT/CN2018/102796 and its Translation of Search Report Into English. (9 Pages).

*Primary Examiner* — Inder P Mehra

(57) ABSTRACT

The present application provides a method for responding to an incoming call by means of fingerprint recognition. The method comprises: when a mobile terminal detects an incoming call, the mobile terminal starts a fingerprint sensor of a fingerprint recognition module; the fingerprint sensor collects a feature point in user fingerprint information, and records a moving track of the feature point; the fingerprint sensor recognizes a fingerprint operation action of a user according to the moving track of the feature point, and uploads the fingerprint operation action to a call system; and the call system marks the fingerprint operation action as a corresponding event and makes a response.

17 Claims, 3 Drawing Sheets

(51) Int. Cl.
*G06F 3/0488* (2013.01)
*G06K 9/00* (2006.01)
*G06F 21/32* (2013.01)

(58) Field of Classification Search
CPC . G06F 21/32; G06K 9/00067; G06K 9/00087
See application file for complete search history.

(56) References Cited

U.S. PATENT DOCUMENTS

| | | | |
|---|---|---|---|
| 2015/0074615 A1* | 3/2015 | Han | G06F 3/04883 715/863 |
| 2016/0307025 A1* | 10/2016 | Lee | G06K 9/00006 |
| 2018/0081490 A1* | 3/2018 | Wang | G06F 3/0418 |
| 2020/0092411 A1* | 3/2020 | Xu | G06K 9/00013 |
| 2020/0105130 A1* | 4/2020 | Chen | G06N 20/00 |

FOREIGN PATENT DOCUMENTS

| | | |
|---|---|---|
| CN | 107517317 | 12/2017 |
| WO | WO 2016/121876 | 8/2016 |
| WO | WO 2019/042292 | 3/2019 |

* cited by examiner

METHOD FOR RESPONDING TO INCOMING CALL BY MEANS OF FINGERPRINT RECOGNITION, STORAGE MEDIUM, AND MOBILE TERMINAL

CROSS REFERENCE RELATED APPLICATIONS

This application is a National Phase of PCT Patent Application No. PCT/CN2018/102796 having International filing date of Aug. 28, 2018, which claims the benefit of priority of Chinese Patent Application No. 201710749759.3 filed on Aug. 28, 2017. The contents of the above applications are all incorporated by reference as if fully set forth herein in their entirety.

FIELD AND BACKGROUND OF THE INVENTION

The present disclosure relates to the field of fingerprint recognition technology, more particularly, to a method for responding to an incoming call by using fingerprint recognition, a storage medium and a mobile terminal.

At present, most smart mobile terminals (such as, mobile phones, tablets, etc.) are equipped with fingerprint recognition. With the continuous development of technology, not only can fingerprint recognition identify the user's fingerprint, but it can also be used for operations including screen unlock, password unlock, etc. In addition to that, fingerprint recognition can also have a navigation function.

SUMMARY OF THE INVENTION

The embodiment according to the present disclosure provides a method for responding to an incoming call by using fingerprint recognition, a storage medium and a mobile terminal. A new function is added to the fingerprint recognition of mobile terminal, that is, the mobile terminal has the navigation function in response to the incoming call.

The embodiment according to the present disclosure provides a method for responding to an incoming call by using fingerprint recognition. The method comprises:
 activating a fingerprint sensor of a fingerprint recognition module when a mobile terminal detecting an incoming call;
 extracting a feature point in fingerprint information of a user and recording a moving track of the feature point by the fingerprint sensor;
 recognizing a fingerprint operation of the user based on the moving track of the feature point and uploading it to a call system_by the fingerprint sensor; and
 marking an event corresponding to the fingerprint operation and responding by the call system.

According to the method, the step of marking the event corresponding to the fingerprint operation and responding by the call system comprises:
 marking the event as a click event and turning off a ringtone for the incoming call when it is recognized that the fingerprint operation of the user is a click;
 marking the event as a swipeup event and answering the call if it is recognized that the fingerprint operation of the user is swiping up;
 marking the event as a swipedown event and hanging up the call if it is recognized that the fingerprint operation of the user is swiping down;
 marking the event as a swipeleft event and hanging up the call and replying a first message at the same time if it is recognized that the fingerprint operation of the user is swiping left; and
 marking the event as a swiperight event and hanging up the call and replying a second message at the same time if it is recognized that the fingerprint operation of the user is swiping right.

According to the method, each of the first message and the second message is a customized setting or a factory setting.

According to the method, the fingerprint sensor comprises any of an optical fingerprint sensor, a semiconductor fingerprint sensor, a thermal fingerprint sensor, an ultrasonic fingerprint sensor, an infrared fingerprint sensor, and a pressure sensitive fingerprint sensor.

According to the method, the step of extracting the feature point in the fingerprint information of the user and recording the moving track of the feature point by the fingerprint sensor comprises:
 collecting the fingerprint information of the user by the fingerprint sensor;
 identifying the feature point in the fingerprint information; and
 recording the moving track of the feature point.

According to the method, the fingerprint sensor acquires the fingerprint information of the user by collecting fingerprint texture images.

According to the method, the moving track is processed to obtain a moving direction of the feature point.

According to the method, after marking the event corresponding to the fingerprint operation and responding by the call system, the method further comprises the following step:
 automatically turning off the fingerprint sensor.

The embodiment according to the present disclosure provides a storage medium storing computer program instructions executable by a processor to perform operations of:
 activating a fingerprint sensor of a fingerprint recognition module when a mobile terminal detecting an incoming call;
 extracting a feature point in fingerprint information of a user and recording a moving track of the feature point by the fingerprint sensor;
 recognizing a fingerprint operation of the user based on the moving track of the feature point and uploading it to a call system_by the fingerprint sensor; and
 marking an event corresponding to the fingerprint operation and responding by the call system.

According to the storage medium, the operation of marking the event corresponding to the fingerprint operation and responding by the call system comprises:
 marking the event as a click event and turning off a ringtone for the incoming call when it is recognized that the fingerprint operation of the user is a click;
 marking the event as a swipeup event and answering the call if it is recognized that the fingerprint operation of the user is swiping up;
 marking the event as a swipedown event and hanging up the call if it is recognized that the fingerprint operation of the user is swiping down;
 marking the event as a swipeleft event and hanging up the call and replying a first message at the same time if it is recognized that the fingerprint operation of the user is swiping left; and
 marking the event as a swiperight event and hanging up the call and replying a second message at the same time if it is recognized that the fingerprint operation of the user is swiping right.

According to the storage medium, the operation of extracting the feature point in the fingerprint information of the user and recording the moving track of the feature point by the fingerprint sensor comprises:

collecting the fingerprint information of the user by the fingerprint sensor;

identifying the feature point in the fingerprint information; and recording the moving track of the feature point.

According to the storage medium, after marking the event corresponding to the fingerprint operation and responding by the call system, the computer program instructions are executable by the processor to perform the following operation:

automatically turning off the fingerprint sensor.

The embodiment according to the present disclosure provides a mobile terminal. The mobile terminal comprises a processor, a memory communicatively connected to the processor. The processor stores a computer program. The processor is configured to call the computer program in the memory to perform operations of:

activating a fingerprint sensor of a fingerprint recognition module when a mobile terminal detecting an incoming call;

extracting a feature point in fingerprint information of a user and recording a moving track of the feature point by the fingerprint sensor, wherein when a finger moves on the fingerprint sensor, the fingerprint sensor collects multiple fingerprint texture images, and then identifies the feature point therein and records the moving track of the feature point;

recognizing a fingerprint operation of the user based on the moving track of the feature point and uploading it to a call system_by the fingerprint sensor, wherein after processing the moving track through an algorithm, a moving direction of the feature point is obtained and is uploaded to the call system; and marking an event corresponding to the fingerprint operation and responding by the call system.

According to the mobile terminal, the operation of marking the event corresponding to the fingerprint operation and responding by the call system comprises:

marking the event as a click event and turning off a ringtone for the incoming call when it is recognized that the fingerprint operation of the user is a click;

marking the event as a swipeup event and answering the call if it is recognized that the fingerprint operation of the user is swiping up;

marking the event as a swipedown event and hanging up the call if it is recognized that the fingerprint operation of the user is swiping down;

marking the event as a swipeleft event and hanging up the call and replying a first message at the same time if it is recognized that the fingerprint operation of the user is swiping left; and marking the event as a swiperight event and hanging up the call and replying a second message at the same time if it is recognized that the fingerprint operation of the user is swiping right.

According to the mobile terminal, each of the first message and the second message is a customized setting or a factory setting.

According to the mobile terminal, the fingerprint sensor comprises any of an optical fingerprint sensor, a semiconductor fingerprint sensor, a thermal fingerprint sensor, an ultrasonic fingerprint sensor, an infrared fingerprint sensor, and a pressure sensitive fingerprint sensor.

According to the mobile terminal, the operation of extracting the feature point in the fingerprint information of the user and recording the moving track of the feature point by the fingerprint sensor comprises:

collecting the fingerprint information of the user by the fingerprint sensor;

identifying the feature point in the fingerprint information; and recording the moving track of the feature point.

According to the mobile terminal, the fingerprint sensor acquires the fingerprint information of the user by collecting fingerprint texture images.

According to the mobile terminal, the moving track is processed to obtain a moving direction of the feature point.

According to the mobile terminal, after marking the event corresponding to the fingerprint operation and responding by the call system, the processor is further configured to call the computer program in the memory to execute the following operation of:

automatically turning off the fingerprint sensor.

Beneficial effects: The present disclosure provides a method for responding to an incoming call by using fingerprint recognition, a storage medium, and a mobile terminal. The method includes activating a fingerprint sensor of a fingerprint recognition module when a mobile terminal detecting an incoming call; extracting a feature point in fingerprint information of a user and recording a moving track of the feature point by the fingerprint sensor; recognizing a fingerprint operation of the user based on the moving track of the feature point and uploading it to a call system_by the fingerprint sensor; and marking an event corresponding to the fingerprint operation and responding by the call system. The present disclosure utilizes the fingerprint recognition module of the smart mobile terminal to add a new function to the fingerprint recognition of mobile terminal, that is, the mobile terminal has the navigation function in response to the incoming call. The incoming call information can be conveniently processed when the smart mobile terminal is held with one hand.

BRIEF DESCRIPTION OF THE SEVERAL VIEW OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF SPECIFIC EMBODIMENTS OF THE INVENTION

These and other features, aspects and advantages of the present disclosure will become understood with reference to the following description, appended claims and accompanying figures.

In the present disclosure, the navigation function is achieved by using fingerprint recognition on a small and simple touch screen, so that some functions can be activated by a user to perform up, down, left, right, and click operations on it. Under normal circumstances, fingerprint recognition is installed on the back of the smart mobile terminal or under the screen. The position configured in this manner can be conveniently operated by the user with one hand. In addition, the smart mobile terminal can preset some reply information. For example, when there is an incoming call from a mobile phone, the user can choose to reject the call and send the selected reply message to the incoming mobile phone.

Figure 1:
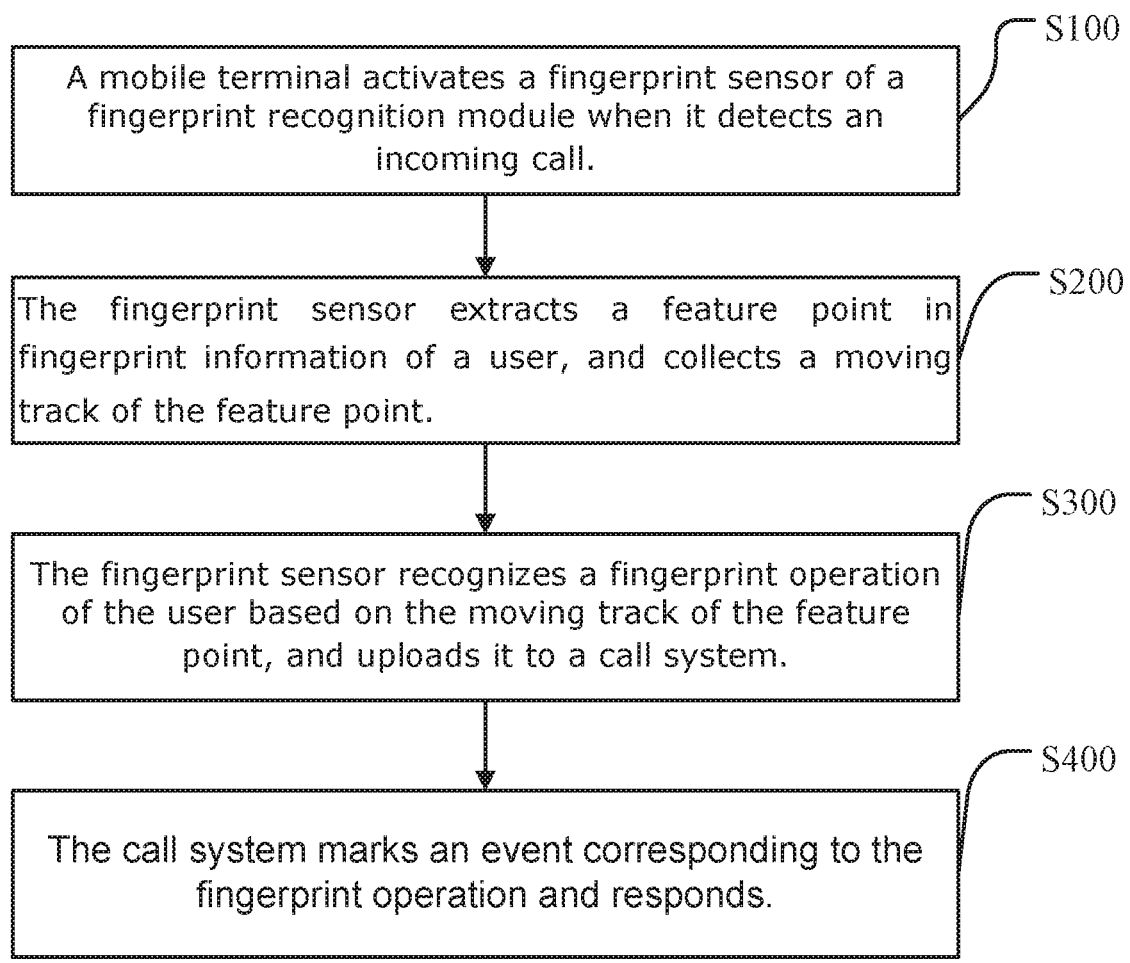
FIG. 1 is a flowchart of a method for responding to an incoming call by using fingerprint recognition according to a preferred embodiment of the present disclosure.

A description is provided with reference to FIG. 1. FIG. 1 is a flowchart of a method for responding to an incoming call by using fingerprint recognition according to a preferred embodiment of the present disclosure. As shown in FIG. 1, the method comprises the following steps:

Step S100: A mobile terminal activates a fingerprint sensor of a fingerprint recognition module when it detects an incoming call.

Step S200: The fingerprint sensor extracts a feature point in fingerprint information of a user, and collects a moving track of the feature point.

Step S300: The fingerprint sensor recognizes a fingerprint operation of the user based on the moving track of the feature point, and uploads it to a call system.

Step S400: The call system marks an event corresponding to the fingerprint operation and responds.

In greater detail, the fingerprint sensor acquires the fingerprint information of the user by collecting fingerprint texture images. The moving track is processed to obtain a moving direction of the feature point.

It is noted that fingerprints have various configurations, such as arch, loop, and whorl. Loop is also further divided into right loop and left loop, and arch is further divided to have tented arch, and so on. If a fingerprint is zoomed, it is found that it rises and falls like a valley. The high ridge line is a crest, and the low one is a trough. Because the bending characteristics of each person's fingerprints are different, they form unique biological characteristics of each individual. The so-called fingerprint feature refers to the distribution of fingerprint ridges. Each ridge has a break, that is, the endpoint. In addition to the endpoints, there are branch points called bifurcation points. Both the endpoints and bifurcation points are feature points, and the feature points are the key to comparing fingerprints. Generally speaking, each fingerprint has about 50 feature points. If the position and direction of the feature points are obtained, they can be used for fingerprint recognition. Generally, the fingerprint recognition technology does not record the entire fingerprint pattern, but only stores the feature points of the fingerprint. When analyzing and comparing, whether the direction and position of the feature points of the fingerprint are the same or not are compared. The principle of fingerprint recognition can be provided by taking a capacitive fingerprint sensor as an example. The capacitive sensor is integrated into a chip. When a fingerprint presses the surface of the chip, the internal capacitive sensor will form a fingerprint image based on the charge differences generated by the crests and the troughs of the fingerprint. That is, the fingerprint sensor will form various capacitance differences, and then draw the texture of the fingerprint based on these various capacitance differences to form the fingerprint image. Finally, after the fingerprint sensor collects the fingerprint texture and identifies its feature points, the feature points can be digitized to complete the fingerprint recognition.

In addition, the fingerprint recognition navigation function refers to the ability to judge how the user swipes on the fingerprint sensor through fingerprint recognition. For example, when the user's finger swipes up, down, left, and right on the fingerprint sensor, it is actually a series of operations in which the user's finger has been pressed, moved, and raised. When the finger moves on the fingerprint sensor, the fingerprint sensor can collect multiple fingerprint texture images, and then identify the feature point therein. Because some of the feature points move with the user's finger when the finger moves, the fingerprint sensor can record the moving tracks of some feature points after collecting multiple fingerprint texture images. After processing these moving tracks through an algorithm, the moving direction of the feature points can be obtained, which reflects the swipe direction of the user's finger. As a result, the navigation function is achieved.

When the mobile terminal detects the incoming call, it activates the fingerprint sensor of the fingerprint recognition module. In greater detail, the fingerprint sensor comprises an optical fingerprint sensor, a semiconductor fingerprint sensor, a thermal fingerprint sensor, an ultrasonic fingerprint sensor, an infrared fingerprint sensor, or a pressure sensitive fingerprint sensor. Generally, there are different division methods according to different standards. Capacitive fingerprint sensors or voltage fingerprint sensors are commonly used in mobile terminals. The fingerprint recognition module refers to a fingerprint recognition area disposed on the back of the mobile terminal or under the screen. After the fingerprint sensor is activated, it starts to extract the feature point in the fingerprint information of the user and records the moving track of the feature point. The fingerprint sensor recognizes the fingerprint operation of the user based on the moving track of the feature point, and then uploads it to the call system directly. The call system marks the event corresponding to the fingerprint operation and responds. In greater detail, after the call system marks the event corresponding to the fingerprint operation and responds, the fingerprint sensor turns off automatically.

It is thus understood that the user can respond to the incoming call and process it directly through the fingerprint operation when the user has the incoming call. Especially, when the mobile terminal is held with one hand, it can be operated without disturbing normal work and life, which provides much convenience for the user.

Figure 2:
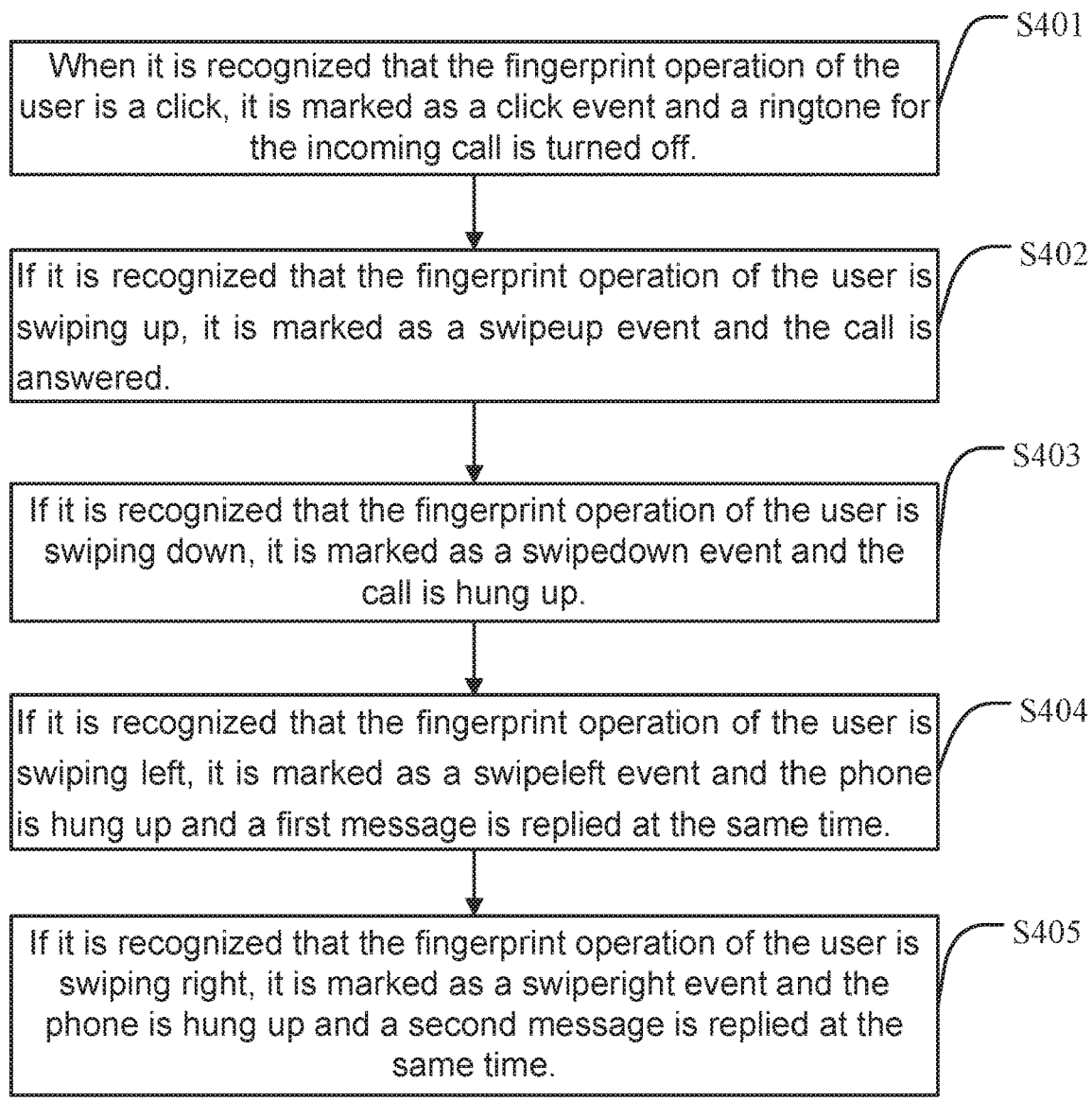
FIG. 2 is a working flowchart of a user operation of fingerprint recognition and response in a preferred embodiment of a method for responding to an incoming call by using fingerprint recognition according to the present disclosure.

As shown in FIG. 2, step S400 comprises:

Step S401: When it is recognized that the fingerprint operation of the user is a click, it is marked as a click event and a ringtone for the incoming call is turned off.

Step S402: If it is recognized that the fingerprint operation of the user is swiping up, it is marked as a swipeup event and the call is answered.

Step S403: If it is recognized that the fingerprint operation of the user is swiping down, it is marked as a swipedown event and the call is hung up.

Step S404: If it is recognized that the fingerprint operation of the user is swiping left, it is marked as a swipeleft event and the phone is hung up and a first message is replied at the same time.

Step S405: If it is recognized that the fingerprint operation of the user is swiping right, it is marked as a swiperight event and the phone is hung up and a second message is replied at the same time.

When it is recognized that the fingerprint operation of the user is the click, it is marked as the click event and the ringtone for the incoming call is turned off. If it is recognized that the fingerprint operation of the user is the swiping up, it is marked as the swipeup event and the call is answered. If it is recognized that the fingerprint operation of the user is the swiping down, it is marked as the swipedown event and the call is hung up. If it is recognized that the fingerprint operation of the user is the swiping left, it is marked as the swipeleft event and the phone is hung up and the first message is replied at the same time. If it is recognized that the fingerprint operation of the user is the swiping right, it is marked as the swiperight event and the phone is hung up and the second message is replied at the same time. Each of the first message and the second message may be a customized setting or a factory setting.

The user can arbitrarily set the events corresponding to the above click, swiping up, swiping down, swiping left and swiping right and incoming call processing according to personal habits when performing customized settings, and the present disclosure is not limited to the above.

Figure 3:
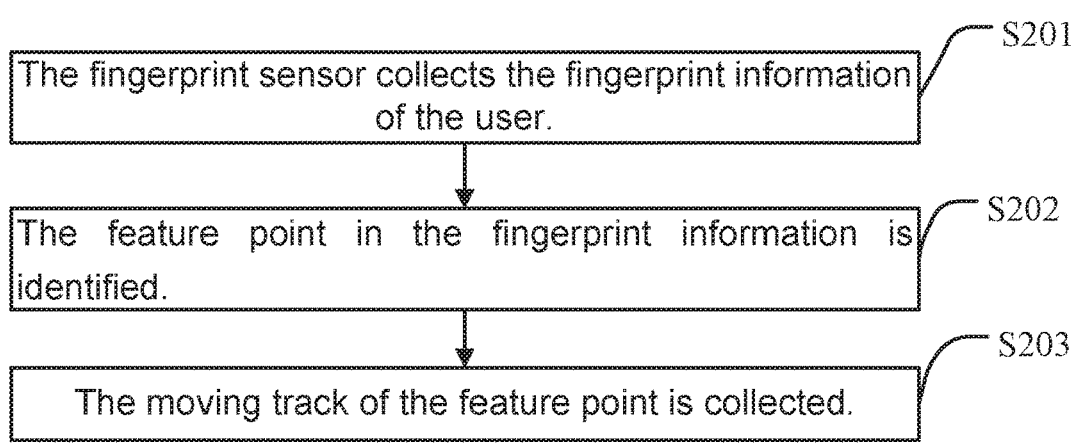
FIG. 3 is a working flowchart of extracting a feature point of fingerprint information in a preferred embodiment of a method for responding to an incoming call by using fingerprint recognition according to the present disclosure.

As shown in FIG. 3, step S200 comprises:

Step S201: The fingerprint sensor collects the fingerprint information of the user.

Step S202: The feature point in the fingerprint information is identified.

Step S203: The moving track of the feature point is collected.

According to the preferred embodiment of the present disclosure, the fingerprint sensor extracts the feature point in the fingerprint information of the user, and collects the moving track of the feature point. In greater detail, the fingerprint sensor collects the fingerprint information of the user, identifies the feature point in the fingerprint information, and collects the moving track of the feature point. That is to say, the fingerprint sensor starts to collect the fingerprint information of the user after sensing the press of the user's finger. As mentioned previously, when the user's finger swipes, the feature points in the fingerprint information also swipe with the user's finger. As a result, after the fingerprint sensor collects the swiping operation of the user, the feature point in the fingerprint information of the user is identified, and the moving track of the feature point is recorded. In this manner, the collection of the feature point of the fingerprint information is completed.

Figure 4:
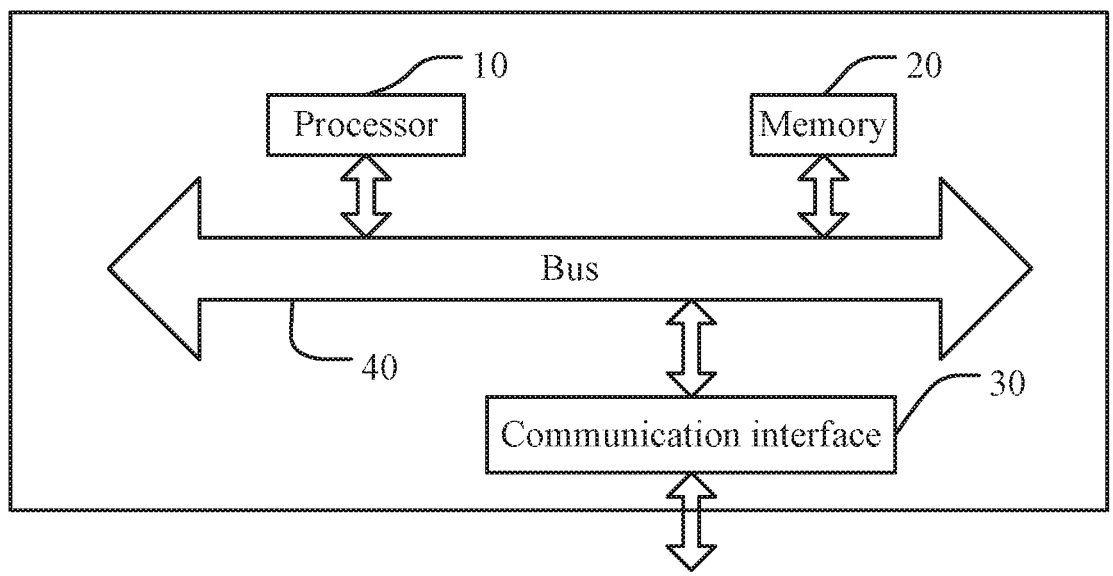
FIG. 4 is a functional block diagram of a mobile terminal according to the present disclosure.

The present disclosure further provides mobile terminal. As shown in FIG. 4, the mobile terminal comprises a processor 10, a memory 20, a communication interface 30 and a communication bus 40.

The processor 10, the memory 20, and the communication interface 30 complete communications with one another through the communication bus 40.

The communication interface 30 is configured to transmit information between the mobile terminal and communication devices.

The processor 10 is configured to call a computer program in the memory 20 to execute the method provided by the above various method embodiments, which includes, for example: the mobile terminal activating the fingerprint sensor of the fingerprint recognition module when it detects the incoming call; the fingerprint sensor extracting the feature point in the fingerprint information of the user, and collecting the moving track of the feature point; the fingerprint sensor recognizing the fingerprint operation of the user based on the moving track of the feature point, and uploading it to the call system; the call system marking the event corresponding to the fingerprint operation and responding.

The present disclosure further provides a storage medium that stores a computer program. The computer program can be executed to achieve the method for responding to the incoming call by using fingerprint recognition.

Figure 5:
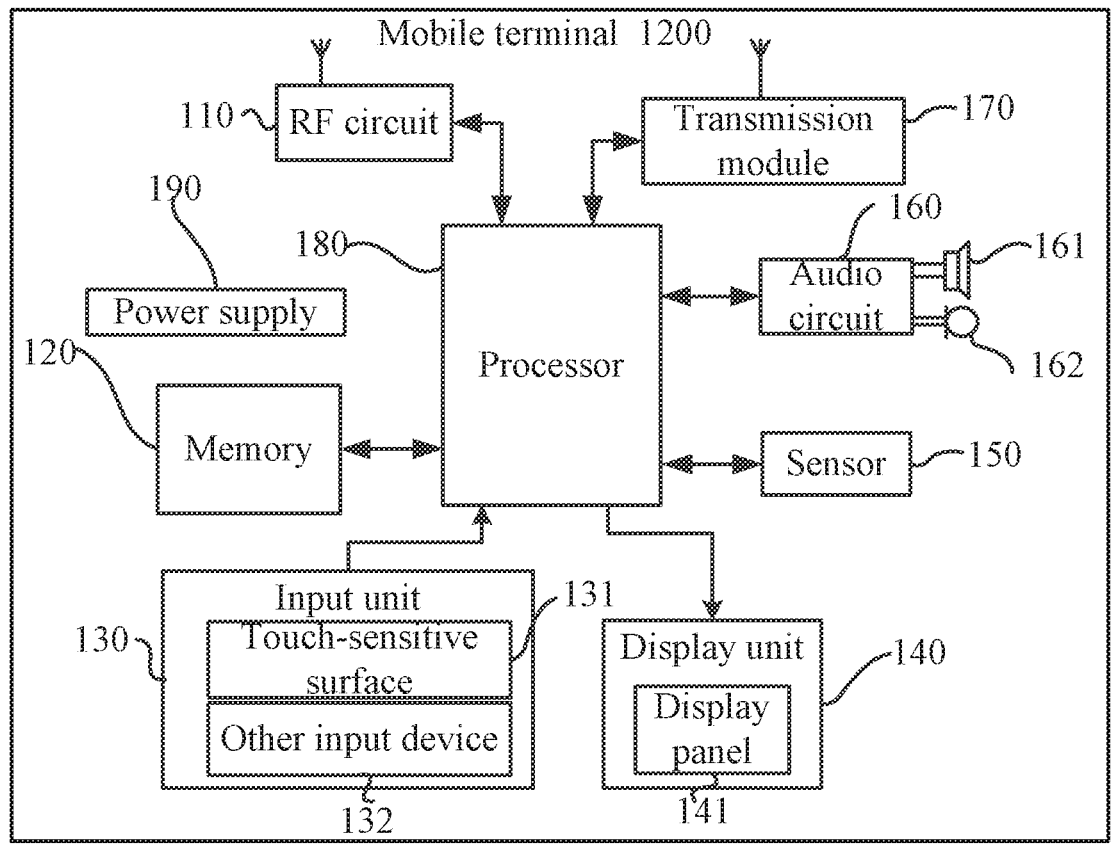
FIG. 5 depicts a schematic diagram of a structure of a mobile terminal according to one embodiment of the present disclosure.

FIG. 5 depicts a block diagram of a detailed structure of a mobile terminal 1200 according to one embodiment of the present disclosure. The mobile terminal 1200 can be used to perform the method for responding to the incoming call by using fingerprint recognition provided by the above embodiment. The mobile terminal 1200 may be a smart phone or a tablet computer.

As shown in FIG. 5, the mobile terminal 1200 may comprise components, such as a radio frequency (RF) circuit 110, a memory 120 including one or more (only one is shown in the figure) computer-readable storage media, an input unit 130, a display unit 140, a sensor 150, an audio circuit 160, a transmission module 170, a processor 180 including one or more (only one is shown in the figure) processing cores, and a power supply 190, etc. Those skilled in the art would understand that the mobile terminal 1200 is not limited to the structure of the mobile terminal 1200 shown in FIG. 5. The mobile terminal 1200 may comprise more or less components than those illustrated in the figure, or some components may be combined, or the mobile terminal 1200 may have different component arrangements.

The RF circuit 110 may be configured to receive and send a signal during an information receiving and sending process or a conversation process. Specifically, after receiving downlink information from a base station, the RF circuit 110 delivers the downlink information to one or more processors 180 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may also communicate with a network and another device by wireless communication. The wireless communication may use any communications standard or protocol, which includes, but is not limited to, a Global System for Mobile communications (GSM), an Enhanced Data GSM Environment (EDGE), a Wideband Code Division Multiple Access (WCDMA), a Code Division Access (CDMA), a Time Division Multiple Access (TDMA), a Wireless Fidelity (Wi-Fi) such as IEEE 802.11a, IEEE 802.11b, IEEE802.11g and IEEE 802.11n, a Voice over Internet Protocol (VoIP), a Worldwide Interoperability for Microwave Access (Wi-Max), any other protocols for e-mail, instant communication and short message, and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to use of the terminal 1200, and the like. In addition, the memory 120 may include a high speed random access memory, and may also include a non-volatile memory, such as at least one magnetic disk storage device, a flash memory device, or another volatile solid-state storage device. Correspondingly, the memory 120 may further include a memory controller, so that the processor 180 and the input unit 130 access the memory 120.

The input unit 130 may be configured to receive input digit or character information, and generate keyboard, mouse, joystick, optical, or track ball signal input related to the user setting and function control. Specifically, the input unit 130 may include a touch-sensitive surface 131 and other input device 132. The touch-sensitive surface 131 may also be referred to as a touch screen or a touch panel, and may collect a touch operation of a user on or near the touch-sensitive surface (such as an operation of a user on or near the touch-sensitive surface 131 by using any suitable object or attachment, such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be implemented by using various types, such as a resistive type, a capacitance type, an infrared type, and a surface sound wave type. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, and a joystick.

The display unit 140 may be configured to display information input by the user or information provided for the user, and various graphical user ports of the terminal 1200. The graphical user ports may be formed by a graph, a text, an icon, a video, and any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine a type of a touch event. Then, the processor 180 provides corresponding visual output on the display panel 141 according to the type of the touch event. Although, in FIG. 5, the touch-sensitive surface 131 and the display panel 141 are used as two separate parts to implement input and output functions, in some embodiments, the touch-sensitive surface 131 and the display panel 141 may be integrated to implement the input and output functions.

The terminal 1200 may further include at least one sensor 150, such as an optical sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the terminal 1200 is moved to the ear. As one type of motion sensor, a gravity acceleration sensor may detect magnitude of accelerations at various directions (which generally are triaxial), may detect magnitude and a direction of the gravity when static, and may be configured to identify an application of a mobile phone attitude (such as switching between horizontal and vertical screens, a related game, and attitude calibration of a magnetometer), a related function of vibration identification (such as a pedometer and a knock). Other sensors, such as a gyroscope, a barometer, a hygrometer, a thermometer, and an infrared sensor, which may be configured in the terminal 1200 are not further described herein.

The audio circuit 160, a loudspeaker 161, and a microphone 162 may provide audio interfaces between the user and the terminal 1200. The audio circuit 160 may transmit, to the loudspeaker 161, a received electric signal converted from received audio data. The loudspeaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, so as to provide communication between a peripheral earphone and the terminal 1200.

The terminal 1200 may help, by using the transmission module 170 (e.g. Wi-Fi module), a user to receive and send an e-mail, browse a webpage, and access stream media, and the like, which provides wireless broadband Internet access for the user. Although FIG. 5 shows the transmission module 170, it may be understood that, the wireless communications unit is not a necessary component of the terminal 1200, and can be ignored according to demands without changing the scope of the essence of the present disclosure.

The processor 180 is a control center of the terminal 1200, and connects various parts of the terminal by using various interfaces and lines. By running or executing the software program and/or module stored in the memory 120, and invoking data stored in the memory 120, the processor 180 performs various functions and data processing of the terminal 1200, thereby performing overall monitoring on the mobile phone. Optionally, the processor 180 may include one or more processing cores. Preferably, the processor 180 may integrate an application processor and a modem. The application processor mainly processes an operating system, a user interface, an application program, and the like. The modem mainly processes wireless communication. It may be understood that, the foregoing modem may not be integrated into the processor 180.

The terminal 1200 further includes the power supply 190 (such as a battery) for supplying power to the components. Preferably, the power supply may be logically connected to the processor 180 by using a power supply management system, thereby implementing functions, such as charging, discharging, and power consumption management, by using the power supply management system. The power supply 190 may further include any component, such as one or more direct current or alternate current power supplies, a re-charging system, a power supply fault detection circuit, a power supply converter or an inverter, and a power supply state indicator.

The mobile terminal 1200 may further comprise a camera (such as a front camera, a rear camera), a Bluetooth module, and the like, and a description in this regard is not provided. In greater detail, a display unit of the mobile terminal is a touch screen display according to the present embodiment.

The mobile terminal further comprises a memory and one or more programs. The one or one or more programs are stored in the memory, and are configured to be executed by one or more processors to perform operations of:

activating a fingerprint sensor of a fingerprint recognition module when a mobile terminal detecting an incoming call;

extracting a feature point in fingerprint information of a user and recording a moving track of the feature point by the fingerprint sensor, wherein when a finger moves on the fingerprint sensor, the fingerprint sensor collects multiple fingerprint texture images, and then identifies the feature point therein and records the moving track of the feature point;

recognizing a fingerprint operation of the user based on the moving track of the feature point and uploading it to a call system by the fingerprint sensor, wherein after processing the moving track through an algorithm, a moving direction of the feature point is obtained and is uploaded to the call system; and marking an event corresponding to the fingerprint operation and responding by the call system.

According to the mobile terminal, the operation of marking the event corresponding to the fingerprint operation and responding by the call system comprises:

marking the event as a click event and turning off a ringtone for the incoming call when it is recognized that the fingerprint operation of the user is a click;

marking the event as a swipeup event and answering the call if it is recognized that the fingerprint operation of the user is swiping up;

marking the event as a swipedown event and hanging up the call if it is recognized that the fingerprint operation of the user is swiping down;

marking the event as a swipeleft event and hanging up the call and replying a first message at the same time if it is recognized that the fingerprint operation of the user is swiping left; and marking the event as a swiperight event and hanging up the call and replying a second message at the same time if it is recognized that the fingerprint operation of the user is swiping right.

According to the mobile terminal, each of the first message and the second message is a customized setting or a factory setting.

According to the mobile terminal, the fingerprint sensor comprises any of an optical fingerprint sensor, a semiconductor fingerprint sensor, a thermal fingerprint sensor, an ultrasonic fingerprint sensor, an infrared fingerprint sensor, and a pressure sensitive fingerprint sensor.

According to the mobile terminal, the operation of extracting the feature point in the fingerprint information of the user and recording the moving track of the feature point by the fingerprint sensor comprises:

collecting the fingerprint information of the user by the fingerprint sensor;

identifying the feature point in the fingerprint information; and recording the moving track of the feature point.

According to the mobile terminal, the fingerprint sensor acquires the fingerprint information of the user by collecting fingerprint texture images.

According to the mobile terminal, the moving track is processed to obtain a moving direction of the feature point.

According to the mobile terminal, after marking the event corresponding to the fingerprint operation and responding by the call system, the processor is further configured to call the computer program in the memory to execute the following operation of:

automatically turning off the fingerprint sensor.

In summary, the present disclosure provides a method for responding to an incoming call by using fingerprint recognition, a storage medium, and a mobile terminal. The method includes activating a fingerprint sensor of a fingerprint recognition module when a mobile terminal detecting an incoming call; extracting a feature point in fingerprint information of a user and recording a moving track of the feature point by the fingerprint sensor; recognizing a fingerprint operation of the user based on the moving track of the feature point and uploading it to a call system_by the fingerprint sensor; and marking an event corresponding to the fingerprint operation and responding by the call system. The present disclosure utilizes the fingerprint recognition module of the smart mobile terminal to add a new function to the fingerprint recognition of mobile terminal, that is, the mobile terminal has the navigation function in response to the incoming call. The incoming call information can be conveniently processed when the smart mobile terminal is held with one hand.

Please note, one or more steps of the above-mentioned full visual navigation method could be achieved by instructing related hardware components (such as processor or controllers) through one or more programs. The above-mentioned programs could be stored in a computer readable storage medium such as a memory, a hard disk, an optical disk or etc.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

What is claimed is:

1. A method for responding to an incoming call by using fingerprint recognition comprising:

activating a fingerprint sensor of a fingerprint recognition module when a mobile terminal detecting an incoming call;

extracting a feature point in fingerprint information of a user and recording a moving track of the feature point by the fingerprint sensor;

recognizing a fingerprint operation of the user based on the moving track of the feature point and uploading it to a call system by the fingerprint sensor; and marking an event corresponding to the fingerprint operation and responding by the call system;

wherein the step of marking the event corresponding to the fingerprint operation and responding by the call system comprises:

marking the event as a click event and turning off a ringtone for the incoming call when it is recognized that the fingerprint operation of the user is a click;

marking the event as a swipeup event and answering the call if it is recognized that the fingerprint operation of the user is swiping up;

marking the event as a swipedown event and hanging up the call if it is recognized that the fingerprint operation of the user is swiping down;

marking the event as a swipeleft event and hanging up the call and replying a first message at the same time if it is recognized that the fingerprint operation of the user is swiping left; and marking the event as a swiperight event and hanging up the call and replying a second message at the same time if it is recognized that the fingerprint operation of the user is swiping right.

2. The method as claimed in claim 1, wherein each of the first message and the second message is a customized setting or a factory setting.

3. The method as claimed in claim 2, wherein the fingerprint sensor comprises any of an optical fingerprint sensor, a semiconductor fingerprint sensor, a thermal fingerprint sensor, an ultrasonic fingerprint sensor, an infrared fingerprint sensor, and a pressure sensitive fingerprint sensor.

4. The method as claimed in claim 1, wherein the step of extracting the feature point in the fingerprint information of the user and recording the moving track of the feature point by the fingerprint sensor comprises:
   collecting the fingerprint information of the user by the fingerprint sensor;
   identifying the feature point in the fingerprint information; and
   recording the moving track of the feature point.

5. The method as claimed in claim 4, wherein the fingerprint sensor acquires the fingerprint information of the user by collecting fingerprint texture images.

6. The method as claimed in claim 4, wherein the moving track is processed to obtain a moving direction of the feature point.

7. The method as claimed in claim 1, wherein after marking the event corresponding to the fingerprint operation and responding by the call system, the method further comprises the following step:
   automatically turning off the fingerprint sensor.

8. A storage medium storing computer program instructions executable by a processor to perform operations of:
   activating a fingerprint sensor of a fingerprint recognition module when a mobile terminal detecting an incoming call;
   extracting a feature point in fingerprint information of a user and recording a moving track of the feature point by the fingerprint sensor;
   recognizing a fingerprint operation of the user based on the moving track of the feature point and uploading it to a call system by the fingerprint sensor; and marking an event corresponding to the fingerprint operation and responding by the call system;
   wherein the operation of marking the event corresponding to the fingerprint operation and responding by the call system comprises:
   marking the event as a click event and turning off a ringtone for the incoming call when it is recognized that the fingerprint operation of the user is a click;
   marking the event as a swipeup event and answering the call if it is recognized that the fingerprint operation of the user is swiping up;
   marking the event as a swipedown event and hanging up the call if it is recognized that the fingerprint operation of the user is swiping down;
   marking the event as a swipeleft event and hanging up the call and replying a first message at the same time if it is recognized that the fingerprint operation of the user is swiping left; and
   marking the event as a swiperight event and hanging up the call and replying a second message at the same time if it is recognized that the fingerprint operation of the user is swiping right.

9. The storage medium as claimed in claim 8, wherein the operation of extracting the feature point in the fingerprint information of the user and recording the moving track of the feature point by the fingerprint sensor comprises:
   collecting the fingerprint information of the user by the fingerprint sensor;
   identifying the feature point in the fingerprint information; and
   recording the moving track of the feature point.

10. The storage medium as claimed in claim 8, wherein after marking the event corresponding to the fingerprint operation and responding by the call system, the computer program instructions are executable by the processor to perform the following operation:
   automatically turning off the fingerprint sensor.

11. A mobile terminal comprising a processor, a memory communicatively connected to the processor, the processor storing a computer program, the processor being configured to call the computer program in the memory to execute the following operations of:
   activating a fingerprint sensor of a fingerprint recognition module when a mobile terminal detecting an incoming call;
   extracting a feature point in fingerprint information of a user and recording a moving track of the feature point by the fingerprint sensor, wherein when a finger moves on the fingerprint sensor, the fingerprint sensor collects multiple fingerprint texture images, and then identifies the feature point therein and records the moving track of the feature point;
   recognizing a fingerprint operation of the user based on the moving track of the feature point and uploading it to a call system by the fingerprint sensor, wherein after processing the moving track through an algorithm, a moving direction of the feature point is obtained and is uploaded to the call system; and marking an event corresponding to the fingerprint operation and responding by the call system;
   wherein the operation of marking the event corresponding to the fingerprint operation and responding by the call system comprises:
   marking the event as a click event and turning off a ringtone for the incoming call when it is recognized that the fingerprint operation of the user is a click;
   marking the event as a swipeup event and answering the call if it is recognized that the fingerprint operation of the user is swiping up;
   marking the event as a swipedown event and hanging up the call if it is recognized that the fingerprint operation of the user is swiping down;
   marking the event as a swipeleft event and hanging up the call and replying a first message at the same time if it is recognized that the fingerprint operation of the user is swiping left; and
   marking the event as a swiperight event and hanging up the call and replying a second message at the same time if it is recognized that the fingerprint operation of the user is swiping right.

12. The mobile terminal as claimed in claim 11, wherein each of the first message and the second message is a customized setting or a factory setting.

13. The mobile terminal as claimed in claim 12, wherein the fingerprint sensor comprises any of an optical fingerprint sensor, a semiconductor fingerprint sensor, a thermal fingerprint sensor, an ultrasonic fingerprint sensor, an infrared fingerprint sensor, and a pressure sensitive fingerprint sensor.

14. The mobile terminal as claimed in claim 11, wherein the operation of extracting the feature point in the fingerprint information of the user and recording the moving track of the feature point by the fingerprint sensor comprises:
   collecting the fingerprint information of the user by the fingerprint sensor;
   identifying the feature point in the fingerprint information; and
   recording the moving track of the feature point.

15. The mobile terminal as claimed in claim 14, wherein the fingerprint sensor acquires the fingerprint information of the user by collecting fingerprint texture images.

16. The mobile terminal as claimed in claim 14, wherein the moving track is processed to obtain a moving direction of the feature point.

17. The mobile terminal as claimed in claim 11, wherein after marking the event corresponding to the fingerprint operation and responding by the call system, the processor is further configured to call the computer program in the memory to execute the following operation of:
   automatically turning off the fingerprint sensor.

* * * * *